US012775429B2

(12) United States Patent
Tuttle et al.

(10) Patent No.: US 12,775,429 B2
(45) Date of Patent: Oct. 27, 2026

(54) PHYSICALLY SEPARATED DISPLAY ZONES ON A DISPLAY

(71) Applicant: Lenovo (Singapore) Pte. Ltd., Singapore (SG)

(72) Inventors: Chris Tuttle, Amherst, OH (US); Nathan Peterson, Oxford, NC (US); Shane Smith, Apex, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 246 days.

(21) Appl. No.: 18/618,643

(22) Filed: Mar. 27, 2024

(65) Prior Publication Data

US 2025/0306830 A1 Oct. 2, 2025

(51) Int. Cl.
*G06F 3/0481* (2022.01)
*G06F 3/14* (2006.01)
*G06F 9/451* (2018.01)

(52) U.S. Cl.
CPC .............. *G06F 3/14* (2013.01); *G06F 3/0481* (2013.01); *G06F 9/451* (2018.02); *G06F 2203/04803* (2013.01)

(58) Field of Classification Search
None
See application file for complete search history.

(56) References Cited

U.S. PATENT DOCUMENTS

2008/0024666 A1* 1/2008 Sudo .................. H04N 21/4858 348/565
2009/0213071 A1* 8/2009 Li ........................... G06F 3/012 345/158
2010/0081475 A1* 4/2010 Chiang ............... H04M 1/2747 715/788
2011/0154248 A1* 6/2011 Tsuruoka .............. G06F 3/1446 715/781
2011/0187662 A1* 8/2011 Lee ....................... G06F 1/1616 345/1.3
2012/0117495 A1* 5/2012 Sirpal ................... G06F 1/1616 715/761
2013/0176248 A1* 7/2013 Shin ........................ G06F 3/041 345/173
2013/0332881 A1* 12/2013 Yook ................... G06F 3/04817 715/781
2014/0152606 A1* 6/2014 Kunitake .............. G06F 1/1647 345/173
2016/0224213 A1* 8/2016 Chen ..................... G06F 3/0485
2016/0283014 A1* 9/2016 Rider ...................... G06F 1/163
2016/0349989 A1* 12/2016 Yu ........................... G06F 3/041
(Continued)

*Primary Examiner* — Tuyetlien T Tran
(74) *Attorney, Agent, or Firm* — FERENCE & ASSOCIATES LLC

(57) ABSTRACT

One embodiment provides a method, the method including: receiving, at an information handling device coupled to a display, a request to display multiple display zones on the display, wherein the information handling device comprises a video card comprising display splitting firmware allowing splitting of the display into multiple display zones; identifying, based upon the request, a number of display zones to be displayed on the display; and displaying, on the display, the number of display zones on the display, wherein the displaying comprises treating each zone, via the splitting firmware, as a physically separated portion of the display. Other aspects are claimed and described.

18 Claims, 3 Drawing Sheets

(56) References Cited

U.S. PATENT DOCUMENTS

| | | | | |
|---|---|---|---|---|
| 2017/0031555 | A1* | 2/2017 | Ma | G06F 3/0488 |
| 2018/0024633 | A1* | 1/2018 | Lo | H04N 23/69 345/156 |
| 2018/0284948 | A1* | 10/2018 | Hao | G06F 3/0481 |
| 2018/0329580 | A1* | 11/2018 | Aurongzeb | G09G 3/035 |
| 2019/0212877 | A1* | 7/2019 | Sipko | G06F 3/1446 |
| 2019/0377459 | A1* | 12/2019 | Jeong | G06F 3/0488 |
| 2020/0278720 | A1* | 9/2020 | Kim | G06F 1/1647 |
| 2020/0302894 | A1* | 9/2020 | Khen | G09G 5/14 |
| 2021/0097901 | A1* | 4/2021 | Klein | G06F 1/1652 |
| 2021/0287593 | A1* | 9/2021 | Baek | G09G 3/007 |
| 2022/0050592 | A1* | 2/2022 | Ezaki | G06F 3/04886 |
| 2022/0187958 | A1* | 6/2022 | Papamarcos | G06F 3/0482 |
| 2022/0309977 | A1* | 9/2022 | Lu | G09G 3/20 |
| 2022/0319468 | A1* | 10/2022 | Han | G09G 5/14 |
| 2023/0009885 | A1* | 1/2023 | Ezaki | G09G 3/20 |
| 2023/0070839 | A1* | 3/2023 | Ito | G09G 3/035 |
| 2023/0094449 | A1* | 3/2023 | Xian | G06F 3/04817 718/102 |
| 2023/0136873 | A1* | 5/2023 | Wang | G06F 3/04897 345/1.1 |
| 2023/0214163 | A1* | 7/2023 | Liu | G06F 3/0482 345/204 |
| 2023/0236720 | A1* | 7/2023 | Opara | G06F 3/04886 715/769 |
| 2023/0335064 | A1* | 10/2023 | Her | G09G 3/3266 |
| 2024/0402884 | A1* | 12/2024 | Guo | G06F 3/14 |
| 2025/0077038 | A1* | 3/2025 | Ninomiya | G06F 3/04883 |
| 2025/0265891 | A1* | 8/2025 | Perea-OcHoa | G07F 17/3218 |

* cited by examiner

PHYSICALLY SEPARATED DISPLAY ZONES ON A DISPLAY

BACKGROUND

Multi-monitor workstations have become increasingly present as routine work has become digital. The commonality of computer-use in everyday life has transitioned from the traditional single-monitor setup to those with two- or more monitors. Whether the use of a multi-monitor system is associated with work, gaming, leisure, and the like, a multi-monitor workstation provides a user with more display ability. A multi-monitor system may provide a user with a plurality of benefits, for example, the ability to view multiple pieces of data simultaneously. However, multiple monitors come with additional needs, such as more space, more cables, more power, and/or the like. Thus, as the quality of larger monitors continue to increase, and the cost per workstation also increase, multi-monitor workstations may become an idea of the past.

BRIEF SUMMARY

In summary, one aspect provides a method, the method including: receiving, at an information handling device coupled to a display, a request to display multiple display zones on the display, wherein the information handling device comprises a video card comprising display splitting firmware allowing splitting of the display into multiple display zones; identifying, based upon the request, a number of display zones to be displayed on the display; and displaying, on the display, the number of display zones on the display, wherein the displaying comprises treating each zone, via the splitting firmware, as a physically separate portion of the display.

Another aspect provides a system, the system including: a processor; a memory device that stores instruction that, when executed by the processor, cases the system to: receive, at an information handling device coupled to a display, a request to display multiple display zones on the display, wherein the information handling device comprises a video card comprising display splitting firmware allowing splitting of the display into multiple displays zones; identify, based upon the request, a number of display zones to be displayed on the display; and display, on the display, the number of display zones on the display, wherein the displaying comprises treating each zone, via the splitting firmware, as a physically separated portion of the display.

A further aspect provides a product, the product including: a computer-readable storage device that stores executable code that, when executed by a processor, causes the product to: receive, at an information handling device coupled to a display, a request to display multiple display zones on the display, wherein the information handling device comprises a video card comprising display splitting firmware allowing splitting of the display into multiple display zones; identify, based upon the request, a number of display zones to be displayed on the display; and display, on the display, the number of display zones on the display, wherein the displaying comprises treating each zone, via the splitting firmware, as a physically separated portion of the display.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
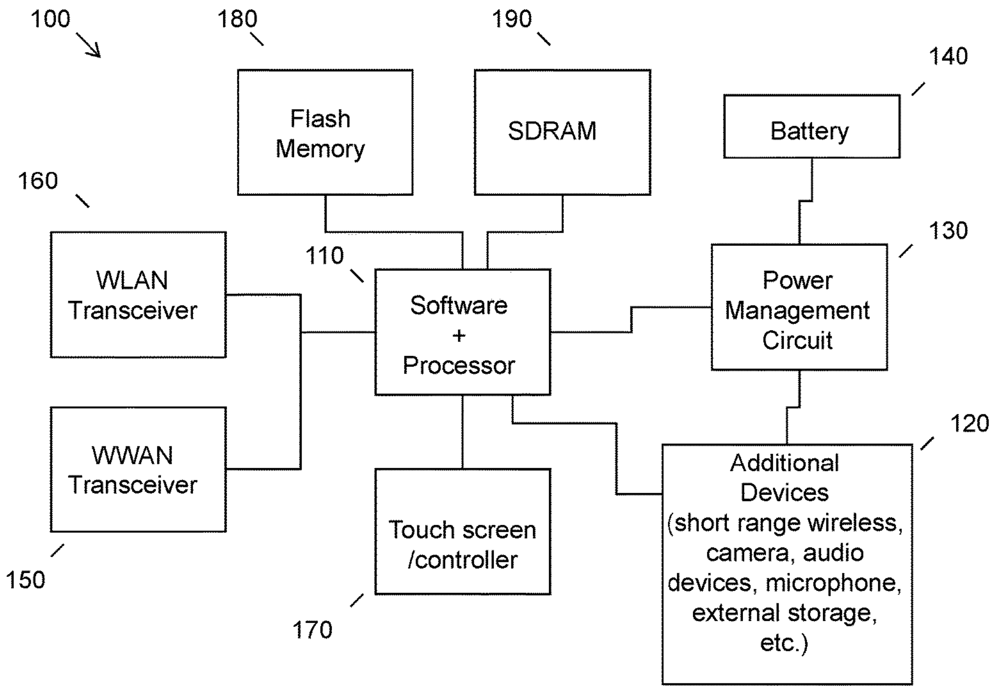
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Display segmentation is a concept that users have been utilizing since the ability to view more than one item on a computer screen has been available. Display segmentation allows a user to position different windows on a display so that the contents of the windows can be seen by the user simultaneously. For example, a user may open a text processing application and an Internet browser and position these two windows on the display screen to permit the viewing of both simultaneously. This segmenting is performed manually where a user has to manually size and position each of the windows so that the windows are positioned to be viewable as desired by the user. The display segmentation becomes more common as users utilize single larger monitors. The user positions windows on the single monitor in a manner that mimics multiple displays, but without the extra space, cables, and/or the like, that is required when utilizing multiple monitors.

Techniques attempting to mitigate overlap and viewing obstruction have been attempted, for example, the 'Snap' feature present certain operating systems. This feature also does not require a user to manually size the window. Rather, the user drags the window to a particular location on the display, and due to the window being located at this position, the operating system automatically sizes and positions the window on the display. However, there are only a particular number of positions these windows can be positioned that work with the 'Snap' feature. Additionally, because the windows are actually contained on a single monitor, each of the windows is subjected to attributes of the monitor.

In other words, the windows are logically separate, but are physically connected. Thus, for example, if a user wishes to reduce the brightness of a display because the main color of a word document is white and is over stimulating to a user, the brightness of a page present on an internet browser that has a primary color of gray will become harder to view. A system cannot adjust an attribute of a display for one application independent of another. Additionally, some applications on a device may be programmed to overtake an entire display regardless of how the user has positioned the window for the application on the display. One such application is a gaming application. After opening a gaming application, a user cannot view any additional applications and/or windows that were previously present on the display while the gaming application is operating. This reduces an overall usability of the display. What is needed is a system and method that may permit portioning of a display into a plurality of display zones that may operate independently from each other, as found with a multiple monitor setup. In other words, what is needed is a system that allows for the physical separation of windows, as allowed in a multi-monitor setup, utilizing a single monitor.

Accordingly, the described system and method provides a technique for displaying multiple display zones that act as physically separated displays on a single display. This system may utilize display splitting firmware installed on a video card of an information handling device to permit the segmentation of a single display into two or more display zones. The system may receive a request to display multiple display zones on a display coupled to an information handing device, and after determining a number of display zones to display and that are permitted to be displayed, as outlined by the video splitting firmware and supported by the video card and display of the information handling device, the system may display a number of display zones that are physically separated portions of the display. Physically separating means that each display zone present on the display acts as if they are independently operable. Such a system and method allow for the segmentation of information on displays that are separate from and, therefore, do not influence or affect information present in another display zone, thereby permitting clear distinction of data between zones.

Therefore, a system and method provide a technique for displaying physically separated display zones on a single display. The display splitting firmware may support a maximum amount of display zones that a display may be split into while also operating inline with an operating system and video card of the information handling device. Then, upon receiving a request to display multiple display zones that are determined to be supported by the display splitting firmware, as well as the video card and operating system of the information handling device, the system may identify how many display zones are desired by the user to be displayed, and further establish the parameters surrounding the size of each display zone on the single display. As the system displays the number of display zones requested by the user, and operate as physically separated portions of the display, the operations performed in each display zone may not influence the viewing, sharing, and/or the manipulation of information present in each of the additional display zones on the display.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
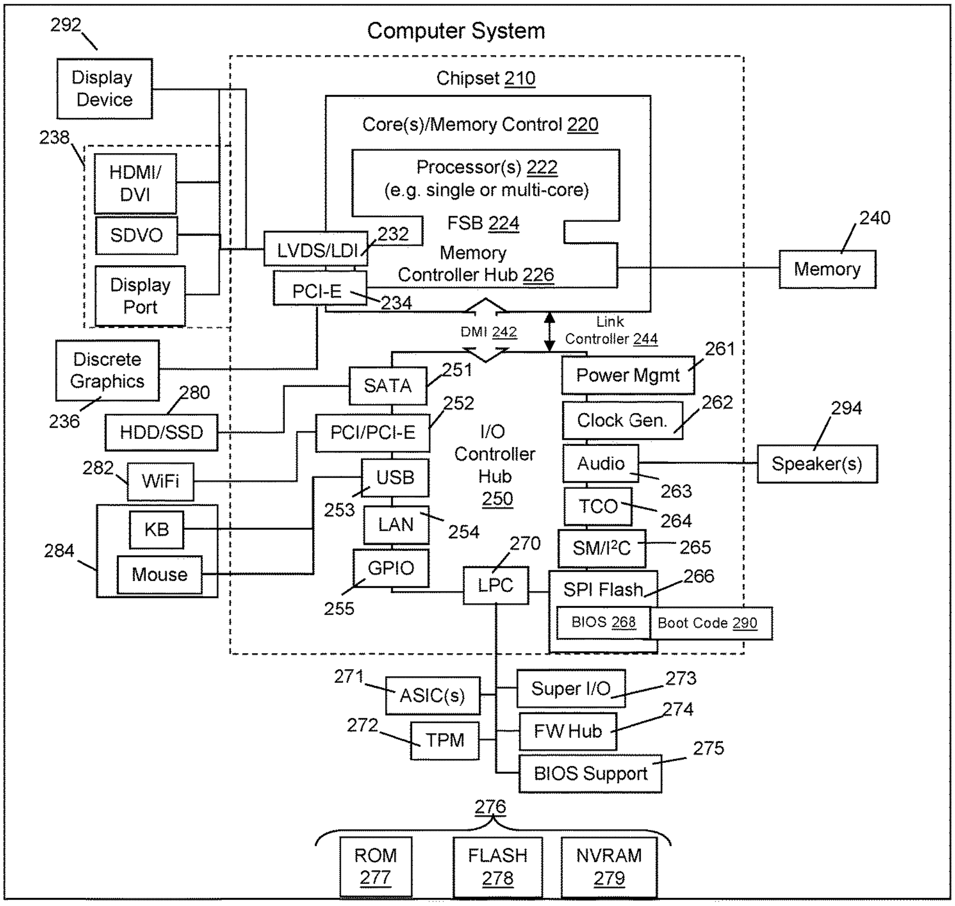
FIG. 2 illustrates another example of information handling device circuitry.

FIG. 2 depicts a block diagram of another example of information handling device circuits, circuitry, or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in devices or systems that include displays or provide instructions for displaying information on a display. For example, the circuitry outlined in FIG. 1 may be implemented in a tablet or smart phone embodiment, whereas the circuitry outlined in FIG. 2 may be implemented in a personal computer embodiment.

Figure 3:
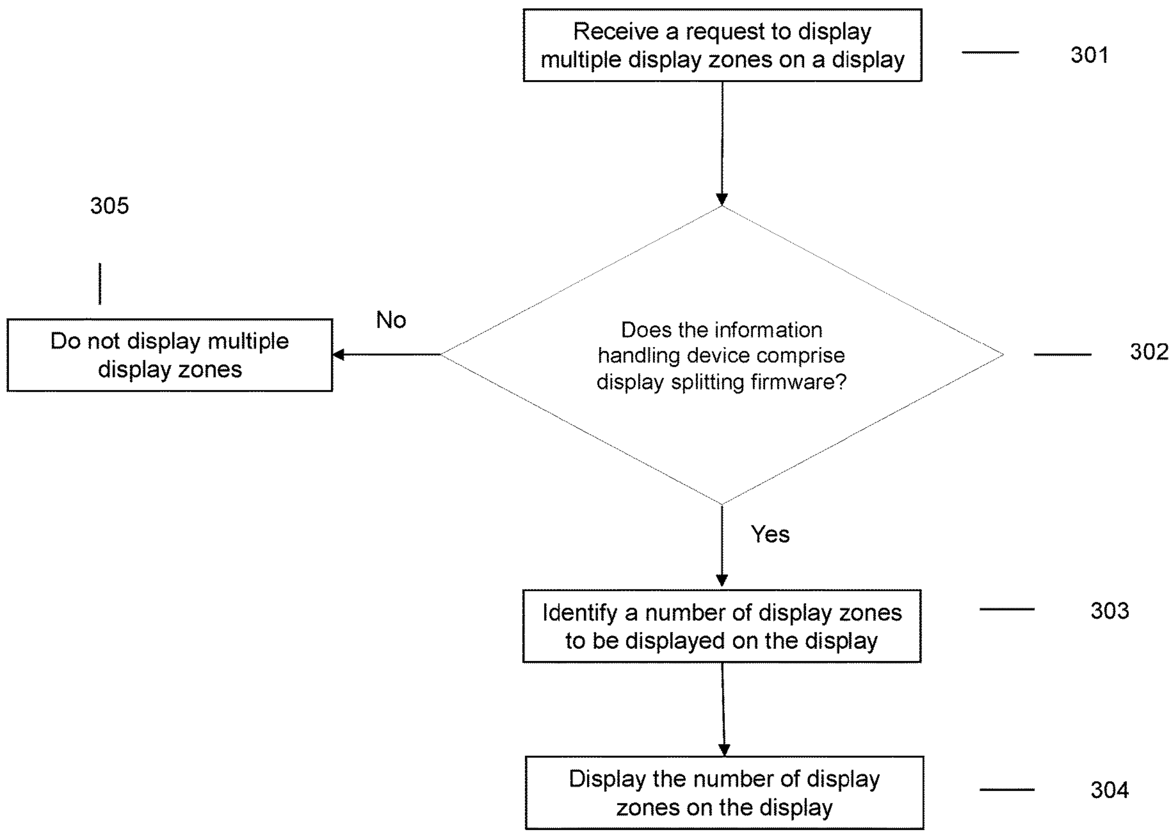
FIG. 3 illustrates an example method for displaying a number of display zones on a display coupled to an information handling device responsive to receiving a request to display multiple display zones on the display and determining if the appropriate display splitting firmware is present within the information handling device.

FIG. 3 illustrates an example method for displaying a number of physically separated display zones on a display of a device based upon receiving a request to display multiple display zones in a system that includes a video card employing device splitting firmware. The method may be implemented on a system which includes a processor, memory device, output devices (e.g., display device, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to display a number of physically separated display zones supported by a display in use and display splitting firmware.

The activation of the display segmenting system may be manual, where a user provides an input indicating that the display segmenting system should be activated, or automatic where the display segmenting system detects a trigger event indicating that the system should be activated. Example trigger events include detection of an inputted request to display multiple display zones, the selection of an application associated with a display zone, and/or the like. For example, the system may receive a request at an information handling device to display multiple display zones on a display of the information handling device. This request may be considered a trigger event that activates the display segmenting system. As another example, identification of a specified user of the information handling device including the display segmenting system may be identified as a trigger event.

The display segmenting system may be a standalone system, may be accessible through other computing devices, and/or a combination thereof. For example, the display segmenting system may be a standalone system that can be accessed by a user and/or may be or provide an application that is accessible by a user on another computing device. The display segmenting system may be accessible using any type of computing device, for example, personal computer, laptop computer, smartphone, tablet, smartwatch, head-mounted display, smart television or other smart appliance, augmented reality device, virtual reality device, and/or the like. Thus, the display segmenting system may be accessible locally using a computing device where the display segmenting system is installed. For example, the display segmenting system may be accessed by a user who is in current use of the information handling device employing the display segmenting system.

The display segmenting system may have an associated graphical user interface. The graphical user interface may be provided on a display or monitor, which may or may not be associated with the display segmenting system. In other words, the display segmenting system may have a dedicated graphical user interface or may be accessible through a traditional device 'Settings' feature.

The graphical user interface may include a plurality of tabs, windows, and/or unique interfaces. The graphical user interface may include graphical user interface icons or elements. Graphical user interface icons or elements may include static non-selectable elements (e.g., headers, footers, logos, global information areas, graphics, etc.), dynamic non-selectable elements (e.g., local information areas applying to a specific element, dynamic graphics, information areas that update based upon the information provided therein, indicators, statistics displays, etc.), static selectable elements (e.g., radio buttons, menu icons, selectable indicators, etc.), dynamic selectable elements (e.g., form field input areas, pull-down menus, pop-up windows, etc.), and/or any other elements that may be found in a graphical user interface.

The graphical user interface may allow a user to provide input identifying information to be used by the display segmenting system. For example, the display segmenting system may utilize a user profile that includes stored display preferences of a user. The graphical user interface may allow for a user to provide input to the user profile, adjust attributes of a display zone that are thereafter saved within the user profile, modify display zone parameters, and/or the like. The graphical user interface may also allow a user to review any requests that have been provided by the user to the display segmenting system, either in real-time or historical alerts or notifications. The user may also provide inputs in relation to an alert or notification through the graphical user interface. It should be noted that the information to be used by the display segmenting system and information provided by the display segmenting system can be different for different applications, different computing systems, different users, different display zones, and/or the like. Thus, the information corresponding to input or output of the display segmenting system are not always the same. However, the display segmenting system may have default or system-wide settings that are the same across different users, systems, applications, and/or the like, until the information is adjusted or otherwise changed.

The display segmenting system may utilize one or more artificial intelligence models in receiving a request to display multiple display zones on a display, identifying a number of display zones to be displayed on the display from the received request, and displaying the number of display zones on the display, each display zone being a physically separated portion of the display. Artificial intelligence models may also be used for steps within a step. For example, a model could be utilized to analyze adjustments and interactions of a user to identify a preference for displaying a plurality of display zones on the display of the information handling device. For ease of readability, the majority of the description will refer to a single artificial intelligence model. However, it should be noted that an ensemble of artificial intelligence models or multiple artificial intelligence models may be utilized. Additionally, the term artificial intelligence model within this application encompasses neural networks, machine-learning models, deep learning models, artificial intelligence models or systems, and/or any other type of computer learning algorithm or artificial intelligence model that may be currently utilized or created in the future.

Artificial intelligence models can be used when identifying a number display zones to be displayed on a display, and when displaying the number of display zones that are all treated as physically separated portions of the display. For example, the models can be used to identify how the display zones on the display should be positioned and a size of each display zone. Additionally, the models may determine from a request received whether the currently displayed display zones need to be changed or altered. Artificial intelligence models can also be used in the capturing of the user behavior to create a user profile. For example, the models can be used to analyze the behaviors of the user to generate a behavior profile of the user and then used to create a user profile. Additionally, or alternatively, the artificial intelligence models can be used to perform other steps, assist in performing some of the steps, and/or the like.

The artificial intelligence model may be a pre-trained model that is fine-tuned for the display segmenting system or may be a model that is created from scratch. Since the display segmenting system is used in conjunction with the identifying of user profiles, analyzing user behaviors, updating a user profile, and comparing user preferences against a profile, some models that may be utilized by the system are entity identification models, similarity identification models, analysis models, filtering models, classification models, and/or the like. The model may be trained using one or more training datasets. Additionally, as the model is deployed, it may receive feedback to become more accurate over time. The feedback may be automatically ingested by the model as it is deployed. For example, as the model is used to determine how the display should be segmented, if a user modifies the segmentation of the display or otherwise provides some indication that the predictions or selections made by the model may be incorrect, the model ingests this feedback to refine the mode.

On the other hand, as the model makes display segmentation predictions, and no changes are made to the predictions, the model may utilize this as feedback to further refine the model. This may be referred to as reinforcement training where a prediction that was made by the model is reinforced as the correct prediction. Training the model may be performed in one of any number of ways including, but not limited to, supervised learning, unsupervised learning, semi-supervised learning, training/validation/testing learning, and/or the like.

As previously mentioned, an ensemble of models or multiple models may also be utilized. Some example models that may be utilized are variational autoencoders, generative adversarial networks, recurrent neural network, convolutional neural network, deep neural network, autoencoders, random forest, decision tree, gradient boosting machine, extreme gradient boosting, multimodal machine learning, unsupervised learning models, deep learning models, transformer models, inference models, and/or the like, including models that may be developed in the future. The chosen model structure may be dependent on the particular task that will be performed with that model.

The display segmenting system may include different components for carrying out different functions of the system, including different steps to be performed when determining the presence of multiple display zones. These components may be hardware components or software components. Some hardware components may include input devices utilized to receive input from the user, for example, mechanical input modalities (e.g., keyboard, mouse, etc.), touch input devices, gesture input devices, electromyography input devices, audio input devices, and/or the like. Other hardware components may be utilized to provide output from the display segmenting system. For example, the system may include speakers, displays or monitors, haptic output devices, audio output devices, and/or the like.

One of the software components that is utilized in the system is the video splitting firmware that is installed on the video card. A video card is essential when producing imagery on a display. This is the portion of an information handling device that may transform system information received into visual representation for a user to view. The display splitting firmware allows the physical splitting of the display into multiple display zones, as opposed to conventional systems in which displays are logically split. The display splitting firmware may have a maximum number of display zones that are supported by the video card and/or firmware. Thus, the display splitting firmware may provide an ability to the system to segment a display coupled to an information handling device into multiple display zones that act as if each of the display zones was a unique monitor or display instead of a part of a larger display. In the system, the display splitting firmware may work in combination with and/or be installed directly onto the video card of the information handling device.

To install the display splitting firmware, a user may provide and the system may access an external storage device that includes the display splitting firmware. The external storage device may be an external hard drive, flash drive, and/or the like, that requires a physical connection to the video card and/or information handling device to install the display splitting firmware. The external storage device may be a database or other data storage location, which may be accessible locally, remotely, on a cloud network, and/or the like. In this case, the user may access or provide instructions to the information handling device to access the data storage location and obtain the firmware and install the firmware on the video card of the device. Additionally, or alternatively, the video card may be manufactured with the display splitting firmware. Accordingly, the user may simply install a video card having the display splitting firmware. Alternatively, the device may already have such a video card installed. Once the appropriate display splitting firmware and video card are established within a device coupled to a display, the system may be permitted to segment the display into supported display zones.

Another software component that is utilized in the system is the profile of the user. The profile of the user includes previously stored preferences of the user with respect to the display zones. This may include the number, size, shape, and position of the display zones on the display. The user profile may include different settings for different uses, profiles, applications, and/or the like, for a user, information handling device, connected display, and/or the like. Accordingly, the user can set different display zone settings for different uses, profiles, components, and/or the like. For example, a single user may utilize a device for both work and personal uses. However, for each of these uses, the user may want different display zones and/or settings. Within the user profile, these zones and/or settings may be set. Then when a user utilizes the device for each of the different uses, the display is automatically set for the preferred settings. As another example, a user may have different monitors that may be connected to a device, with each monitor having different physical characteristics. Based upon these physical characteristics, the user may want different display zones and/or display zone settings. These can be set within the user profile. The overall profile which is unique to a user, even if it includes multiple profiles that are dependent on different factors (e.g., components detected, applications open, use, etc.), will be referred to as a user profile for ease of readability.

To create a user profile the system is essentially set in a training mode. The training mode allows the system to capture preferences and adjustments to attributes of a display zone made by a user within a space. Before capturing behaviors of the user within the space, a default display layout and settings may be presented. This provides the system with a baseline of what applications are present in a singular display zone. Once a user starts to utilize the information handling device, the display segmenting system monitors the user and collects information about the behavior of the user while operating the information handling device. In other words, in order to accurately identify behaviors of the user, the system identifies and records the adjustments made to attributes and parameters of the display and each affiliated display zone while operating the information handling device. Accordingly, the system utilizes components or devices that can capture the information that is needed.

Behaviors of the user refer to the adjustments made to display zone settings while the user utilizes a display that has been portioned in a plurality of physically separated display zones found on a single display. Adjustments performed by the user include adjustments used to increase viewability of a display zone, alter the size and location of the display zone on the display in use, and perform operations within a display zone that is independent from the additional display zones present. The operations are those that change a display zone or settings of a display zone uniquely as compared to other display zones or display zone settings. For example, if a user changes a color scheme of one display zone, this would be an operation of this display zone because the color scheme is not changed for other display zones.

From the behaviors of the user while operating the information handling device, particularly over time, the display segmenting system can identify patterns of a user. Thus, from the behaviors captured during the training, the system may analyze the behaviors to identify patterns of the user with respect to display zones while the device is in operation. Accordingly, from the captured behaviors of the user, the system can identify the patterns and from these patterns can create a user profile while the device is in operation. Accordingly, the behavior profiles of a user are very complex and may take into account many different factors, objects, and/or the like, to accurately reflect the behavior of the user while operating the information handling device coupled to a display. The user profile may also take into account information regarding display zones that have been specifically provided by the user. For example, the user may identify that a certain use should have a certain number of display zones. In other words, in addition to, or alternatively from, the automatic identification of display zones and display zone settings from user behavior, the user can manually provide information regarding display zones and display zone settings into the user profile.

At 301, the system may receive a request to display multiple display zones on a display at an information handling device coupled to a display. The request may be an input provided by the user at the information handling device. For example, a request may be a manual input performed by a user associated with user display settings, for example, within a settings menu or application. Additionally, or alternatively, the request to display multiple display zones on a display at 301 may include a user utilizing a system shortcut provided on the display of the information handling device. For example, a shortcut may be present on a task bar along the edge of a display coupled to a desktop computer. These examples are not intended to limit a type of request that a system may receive from a user.

Additionally, or alternatively, a request to display multiple display zones on a display 301 may be in response to opening an application or particular operating system profile on an information handling device. The application or operating system profile may be associated with different display zones and display zones settings. The application or operating system profile may trigger the system to access a profile associated with the user. It should be noted that other actions may also trigger the system to access a user profile. A user profile may include display zone preferences, which may include settings for each displayed display zone, a number of display zones to be displayed, attributes for each of the display zones (e.g., size, shape, position on the display, etc.), and/or the like. In the case that display zone preferences are not available, the system may apply default display zone preferences. Using user input or user behavior monitoring, the system can learn display zone and display zone preferences. Thus, as previously mentioned, the system may learn what display preferences a user has based upon applications in use, orientation and/or location of display zones on a display, displays accessible by the device, and/or the like. Therefore, when a request to display multiple display zones on a display is received 301, the system may utilize predetermined display zone preferences to enact upon the request.

After receiving the request to display multiple display zones on a display 301, the system may then determine, at 302, if the information handing device contains display splitting firmware, at 302. More specifically, the system may determine if the information handling device contains operable display splitting firmware. As mentioned previously, the display splitting firmware allows for the presentation of multiple display zones on a display that mimic physically separated displays using a single video card and single cable from the video card as opposed to multi-monitor setups which require at least multiple cables and, possibly, multiple video cards. The operating system sees each of the display zones as individual monitors, similar to how the operating system would see and treat each of the monitors in a multi-monitor setup. If the information handling device includes a video card that does not include the display splitting firmware, the system will not display multiple display zones at 305. In this situation, the system will split the display as per conventional systems where the windows on the display are treated as logically separated.

When it is determined, at 302, that the information handling device does include display splitting firmware, the system may then identify a number of display zones to be displayed on the display, at 303. In the system, the identifying a number of display zones to be displayed stems from the request received at 301. A user may request a number of display zones to be displayed on a single display coupled to a device, and from this request, the system may identify the desired number of display zones to be displayed at 303. For example, the request may include a specific number of display zones a user would like to have on the display.

In the system, when receiving a request to display multiple display zones on a display 301, the system may detect the display splitting firmware. From this the detecting, the system may automatically implement a number of display zones based upon the detected display splitting firmware. For example, upon receiving a request to display three display zones on a display, the system may transition the display from a traditional one display zone to three display zones without the need of additional user input. Additionally, or alternatively, in the system, after receiving a request to display multiple display zones, the system may detect the display splitting firmware of the device and then query a user as to how many display zones a display shall be segmented into. For example, upon receiving the request to display multiple display zones, the system may provide a notification to a user requesting the user provide a desired amount of display zones.

Additionally, the notification may include a maximum number of display zones that a display may be portioned into, and a user may select a number of display zones either equal to or less than the maximum amount of display zones that may be supported by the display splitting firmware, the video card of the information handling device, the display, the information handling device, the operating system, and/or the like. In other words, any of the display splitting firmware, the video card, the display, the information handling device, the operating system, and/or the like, may limit the maximum number of display zones that can be displayed. In the event that all of the components have a different maximum number of display zones, the system may display to the user as the maximum number of display zones, the smallest number of the maximum display zones. For example, if the display splitting firmware supports 10 display zones, the video card supports 6 display zones, and the display supports 8 display zones, the system will indicate to the user that the maximum number of display zones is 6 because it is the lowest maximum number of the display zone limiting components.

In the system, the number of display zones to be displayed on the display at 303 may be based upon information received from a user profile, an application, a use, and/or the like. Upon receipt of this information, the system may determine that a number of displayed display zones should be changed. For example, an attempt to access an associated application on the information handing device may be received in the request at 301, and from this request the system may determine that an additional display zone should be displayed. The system may determine that accessing a certain application routinely includes displaying the application in a new display zone. This may occur because of a display zones ability to act as a physically separated portion of the display, meaning that the commands present in any additional display zones may not influence the information, application, and/or the like, present in the display zone. Therefore, the system may learn over time that upon activation of a recognized application on a device, the system may identify, at 303, that a display zone including the newly opened application should be displayed. Additionally, or alternatively, any application requiring a display zone upon activation of the application may be predetermined, either by a user and/or a manufacturer, prior to the opening of the application.

Additionally, or alternatively, a number of display zones to be displayed on the display at 303 may be identified based upon a default number of zones associated with a profile on the information handling device. As mentioned previously, a user profile of a user utilizing the system may have predetermined display zone preferences, and upon that user accessing the system, the system may display a predetermined number of display zones associated with a profile. As previously mentioned, the number of display zones can change for the same user based upon a use of the system, an application the user is accessing, a time frame when the user is accessing the system, and/or the like. The user profile may include the correlation of a display zone with an application, meaning that upon activation of an application one or more display zones may be added or changed. It should be noted that activation of an application may result in more than one display zone being activated or changed. In other words, there is not a 1:1 correlation between applications, windows, and/or the like, and display zones. As an example, a user may frequently open two applications together or work in two applications together. Accordingly, with the activation of one of those applications, the system may add two display zones, one for the activated application and one for the expected application.

The user profile may include display zone preferences associated with a user that may be enacted upon detection of the user. For example, on a shared device that includes the appropriate display splitting firmware, a first user associated with a first user profile may prefer a display with two physically separated portions on the display. On the other hand, a second profile associated with a second user may prefer a display with three physically separated portions on the display. Similarly, a work profile for a user may include two display zones, whereas a personal profile for the same user may include a single display zone. The system may further learn and adjust display zone preferences as a user interacts with the system.

A profile on the information handling device may include predetermined display zone preferences or attributes (e.g., display zone settings, size, shape, position on the display, etc.) that, as previously mentioned, may be adjusted and learned over time. Display zone settings may include, but are not limited to, a color scheme, display zone brightness, theme, resolution, color balance, text size, and/or the like. Adjustments to an attribute may be tracked and, thereafter, saved in a user profile after completion of an adjustment and/or a task. For example, a user who may be colorblind may elect to reduce the colors of red and green in a display zone for ease of viewing. The system may then save this color balance attribute adjustment made by the user in the user profile, and upon reopening a display zone in the future, employ the color balance preference once again. Additionally, or alternatively, a user may elect to not save the attribute adjustment performed in a display zone. When this occurs, the attributes that were adjusted during a session utilizing the display zone will revert back to the original attribute levels and will not be provided when reopening the display zone.

As another example, the adjusting of an attribute of at least one of the display zones may include adjusting a position of the display zone on the display. A user may adjust a position attribute of the display zones being displayed on the display based on user preference. For example, a user may prefer to have a word processing application present in a display zone on the left of a two-display zone display and a display zone containing an internet browser positioned to the right, or vice vera. The system may record these attribute preferences in a profile, and upon identifying a number of zones to be displayed on the display 303, the system may position the display zones on the display based on previously recorded user display zone preferences that have been stored in a profile associated with a user, including the position of the display zones with respect to the position of other display zones. In this example, upon opening the word processing application, it would be positioned on the left of the two-display zone display. The position may change based upon other applications or display zones that are activated. For example, a user may want the word processing application on the left when an Internet browser is active, but may want the word processing application on the right when a spreadsheet application is active.

Another attribute that can be modified is a size of the display zone. In one example, the size of each display zone may be equal in size. In other words, the system may determine, from the size of the display, parameters for each display zone that may be displayed on the display. Referring to the example above, when a two-display zone display is requested by a user, the system may split the display in half and provide a user with two display zones that are equal in size. The system may portion the display equally for the plurality of display zones requested to be displayed by the user. Additionally, or alternatively, based on the number of display zones requested 301 and thereafter identified by the system 303, the system may elect to position each display zone based upon a maximum viewing attribute. For example, when the system receives a request to display four display zones on a display of a device, rather than positioning each of these display zones horizontally adjacent to one another, the system may elect to position each of the four display zones in a quadrant of the display. Positioning the display zones in such away will maximize the viewability of each display zone, rather than providing a user with a display including four narrow display zones.

On the other hand, a user may prefer to have display zones that are not equal in size or do not include the same size parameters. A user may elect to prioritize one or more display zones over additional display zones present on a display. For example, if a user requests to display three display zones on the display, the user may position display zones one and two on top of one another, as if in a first quadrant (top left side of a display) and a third quadrant (bottom left side of a display), while the third display zone occupies the entire right side of the display. In such a system, the parameters of display zones one and two may include the same size parameters, whereas display zone three will occupy twice as much space of the overall display. Once again, the system may recognize and record such attribute adjusting and display zone orientations, and store these preferences in a user profile for future use. The system may also permit user adjustments to display settings for all attributes and parameters of the display zones. For example, in a system that a user requests a display containing four display zones to be displayed on the display, the system may allow a user to adjust size and location parameters of each display zone, and permit adjusting attributes associated with each display zone. In other words, the display zones displayed on the display may be customizable by a user.

After identifying a number of display zones to be displayed on the display at 303, the system may display the number of display zones on the display at 304. This may include up to the maximum number of displays as identified at 303. As previously mentioned, the displaying of the display zones on the display at 304 may follow predetermined user preferences associated with attributes of each of the display zones being displayed. Additionally, display of the number of display zones on the display treats each zone as a physically separated portion of the display. A physically separated portion of the display or a display zone may act independently from other one or more additional display zones being displayed. Thus, when an adjustment to an attribute, the opening of an application, the performing of calculations, and/or the like, is performed with respect to a display zone being displayed, the additional display zones do not respond to these user inputs.

For example, if a user is adjusting a color balance for a first display zone being displayed and wishes to adjust the color balance of a second display zone, the user may independently adjust the color balance attributes for each of the two display zones being displayed on the display of the device. Additionally, in a traditional display system, some applications attempt to overtake an entire display, for example, when opening a gaming application. In the current system, rather than permitting this overtaking of an entire display when opening a gaming application, the system may permit the gaming application overtake a display zone the gaming application is being opened within, and any additional display zones being displayed may remain uninfluenced since they are physically separated portions of the display.

Therefore, the provided system and method provides improvements over traditional display segmenting techniques. Rather than utilizing a system that logically separates a display based on application windows opened within a single display zone, the current system and method physically separates portions of the display into display zones that will act independently from one another. Logically separating a display that contains only one display zone will result in the adjusting of attributes influencing a display in its entirety, rather than limiting adjustments to one of a plurality of display zones displayed on a display of an information handling device. Thus, the described system and method allows a user more flexibility when setting up a single display and provides a display that mimics a multi-monitor setup without the additional components, cables, and supporting software required by a multi-monitor setup.

As will be appreciated by one skilled in the art, various aspects may be embodied as a system, method, or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices, and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:

receiving, at an information handling device coupled to a display, a request to display multiple display zones on the display, wherein the receiving the request comprises receiving a request to access a profile on the information handling device, wherein the information handling device comprises a video card comprising display splitting firmware allowing splitting of the display into multiple display zones;

identifying, based upon the request and the display splitting firmware, a number of display zones to be displayed on the display, wherein the identifying comprises identifying a user that provided the request to the information handling device and accessing the profile of the user associated with the information handling device, wherein the number of display zones to be displayed is dependent on the display splitting firmware; and displaying, on the display and permitted by the display splitting firmware, the number of display zones on the display, wherein the displaying comprises treating each zone, via the splitting firmware, as a physically separated portion of the display, wherein the displaying the number of display zones comprises dynamically displaying the number of display zones based on one or more user preferences stored in the profile of the user.

2. The method of claim 1, wherein the identifying comprises identifying a default number of display zones associated with the profile of the information handling device.

3. The method of claim 1, wherein the receiving the request comprises detecting the display splitting firmware and automatically implementing a number of display zones based upon the display splitting firmware.

4. The method of claim 1, comprising receiving input from the user adjusting an attribute of at least one of the display zones.

5. The method of claim 4, comprising saving the attributes within the user profile for the user and, upon subsequent access of the user to the information handling device, employing attributes for the at least one of the display zones during the displaying.

6. The method of claim 1, wherein the displaying comprises displaying the display zones each having an equal size and shape to the other of the display zones.

7. The method of claim 1, wherein the displaying comprises allowing user adjustment to display settings for each of the display zones individually.

8. The method of claim 1, wherein the identifying a number of display zones comprises identifying a number of display zones permitted by the display splitting firmware and wherein the displaying comprises displaying no more display zones than the number of display zones permitted by the display splitting firmware.

9. The method of claim 1, wherein the identifying comprises identifying a number of display zones permitted by the display and where in the displaying comprises displaying no more display zones than the number of display zones permitted by the display.

10. A system, the system comprising:

a processor;

a memory device that stores instruction that, when executed by the processor, causes the system to:

receive, at an information handling device coupled to a display, a request to display multiple display zones on the display, wherein to receive the request comprises receiving a request to access a profile on the information handling device, wherein the information handling device comprises a video card comprising display splitting firmware allowing splitting of the display into multiple displays zones;

identify, based upon the request and the display splitting firmware, a number of display zones to be displayed on the display, wherein to identify comprises identifying a user that provided the request to the information handling device and accessing the profile of the user associated with the information handling device, wherein the number of display zones to be displayed is dependent on the display splitting firmware; and display, on the display and permitted by the display splitting firmware, the number of display zones on the display, wherein to display comprises treating each zone, via the splitting firmware, as a physically separated portion of the display, wherein to display the number of display zones comprises dynamically displaying the number of display zones based on one or more user preferences stored in the profile of the user.

11. The system of claim 10, wherein the identifying comprises identifying a default number of display zones associated with the profile on the information handling device.

12. The system of claim 10, wherein the receiving the request comprises detecting the display splitting firmware and automatically implementing a number of display zones based upon the display splitting firmware.

13. The system of claim 10, comprising receiving input from the user adjusting an attribute of at least one of the display zones.

14. The system of claim 13, comprising saving the attributes within the user profile for the user, and upon subsequent access of the user to the information handling device, employing attributes for the at least one of the display zones during the display.

15. The system of claim 10, wherein the displaying comprises displaying the display zones each having an equal size and shape to the other of the display zones.

16. The system of claim 10, wherein the displaying comprises allowing user adjustment to display settings for each of the display zones individually.

17. The system of claim 10, wherein the identifying a number of display zones comprises identifying a number of display zones permitted by the display splitting firmware and wherein the displaying comprises displaying no more display zones than the number of display zones permitted by the display splitting firmware.

18. A product, the product comprising:

a computer-readable storage device that stores executable code that, when executed by a processor, causes the product to:

receive, at an information handling device coupled to a display, a request to display multiple display zones on the display, wherein to receive the request comprises receiving a request to access a profile on the information handling device, wherein the information handling device comprises a video card comprising display splitting firmware allowing splitting of the display into multiple display zones;

identify, based upon the request and the display splitting firmware, a number of display zones to be displayed on the display, wherein to identify comprises identifying a user that provided the request to the information handling device and accessing the profile of the user associated with the information handling device, wherein the number of display zones to be displayed is dependent on the display splitting firmware; and display, on the display and permitted by the display splitting firmware, the number of display zones on the display, wherein to display comprises treating each zone, via the splitting firmware, as a physically separated portion of the display, wherein to display the number of display zones comprises dynamically displaying the number of display zones based on one or more user preferences stored in the profile of the user.

* * * * *